United States Patent
McQuistan et al.

(10) Patent No.: US 10,223,430 B2
(45) Date of Patent: Mar. 5, 2019

(54) INTELLIGENT PLAYBOOK APPLICATION

(71) Applicant: Impakt Athletics, Inc., Waukee, IA (US)

(72) Inventors: Zac McQuistan, Sammamish, WA (US); Jason Brescia, Seattle, WA (US)

(73) Assignee: Impakt Athletics, Inc., Waukee, IA (US)

( * ) Notice: Subject to any disclaimer, the term of this patent is extended or adjusted under 35 U.S.C. 154(b) by 353 days.

(21) Appl. No.: 15/141,007

(22) Filed: Apr. 28, 2016

(65) Prior Publication Data

US 2016/0321950 A1    Nov. 3, 2016

Related U.S. Application Data

(60) Provisional application No. 62/153,847, filed on Apr. 28, 2015.

(51) Int. Cl.
*G09B 19/00* (2006.01)
*G06F 17/30* (2006.01)
(Continued)

(52) U.S. Cl.
CPC ...... *G06F 17/3056* (2013.01); *G06F 3/04812* (2013.01); *G06F 17/241* (2013.01);
(Continued)

(58) Field of Classification Search
CPC ............. G06F 3/04842; G06F 3/04845; G06F 3/0482; G09B 5/02; G06T 11/203
(Continued)

(56) References Cited

U.S. PATENT DOCUMENTS 6,167,439 A  *  12/2000  Levine ................ G06F 3/04817
                                                      358/408
8,463,765 B2     6/2013  Lesavich
(Continued)

OTHER PUBLICATIONS

CoachsOffice.com, review via youtube, "https://www.youtube.com/watch?v=3Y3FzLzPTiA", published Dec. 13, 2014.*
(Continued)

*Primary Examiner* — Michael Cuff
(74) *Attorney, Agent, or Firm* — Goodhue, Coleman & Owens, P.C.

(57) ABSTRACT

An intelligent digital coaching playbook and related methods and systems are provided that automatically convey a freehand drawing to a structured, relational, and classified database to improve related coaching processes, make plays searchable, and enable analytics. A method for receiving input into a technology driven athletic intelligence system includes receiving, at a computing device, user drawn input describing a player assignment, while receiving the user drawn input, monitoring using the computing device, slope changes of the user drawn input and time interval changes of the user drawn input, using the slope changes of the user drawn input and the time interval changes of the user drawn input by the computing device to identify a pivot point associated with the player assignment, and re-drawing using the computing device, the user drawn input using the pivot point, slopes of the user drawn input and distances associated with the user drawn input.

15 Claims, 14 Drawing Sheets

(51) Int. Cl.
 *G06T 11/20* (2006.01)
 *G09B 5/02* (2006.01)
 *G06F 3/0481* (2013.01)
 *G06F 17/24* (2006.01)
 *G06N 5/02* (2006.01)

(52) U.S. Cl.
 CPC .............. *G06N 5/02* (2013.01); *G06T 11/203* (2013.01); *G09B 5/02* (2013.01)

(58) Field of Classification Search
 USPC .............................................. 700/91; 463/31
 See application file for complete search history.

(56) References Cited

U.S. PATENT DOCUMENTS

| | | | |
|---|---|---|---|
| 9,185,361 B2 | 11/2015 | Curry | |
| 9,283,457 B2 | 3/2016 | Thurman et al. | |
| 9,443,332 B2 * | 9/2016 | Brumer | G06T 11/203 |
| 9,610,491 B2 * | 4/2017 | Cronin | G06F 17/30781 |
| 9,751,018 B2 * | 9/2017 | Colony | G06Q 50/34 |
| 2007/0142108 A1 * | 6/2007 | Linard | A63F 9/18 463/22 |
| 2010/0306717 A1 * | 12/2010 | Yamada | A63F 13/2145 715/863 |
| 2013/0022332 A1 * | 1/2013 | Platt | G11B 27/007 386/230 |
| 2013/0060362 A1 | 3/2013 | Murphy et al. | |
| 2013/0065655 A1 * | 3/2013 | King | G06T 13/00 463/2 |
| 2013/0138590 A1 | 5/2013 | Huke et al. | |
| 2013/0139068 A1 | 5/2013 | Bowring | |
| 2013/0316837 A1 * | 11/2013 | Coiner, Jr. | G06F 17/30398 463/43 |
| 2016/0067607 A1 * | 3/2016 | Fernandez | A63F 13/63 463/31 |
| 2016/0267804 A1 * | 9/2016 | Pemba | G09B 7/02 |

OTHER PUBLICATIONS

Sha, Long: "Chalkboarding: A New Spatiotemporal Query Paradigm for Sports Play Retrieval", Mar. 2016.

* cited by examiner

INTELLIGENT PLAYBOOK APPLICATION

PRIORITY STATEMENT

This application claims priority to U.S. Provisional Patent Application No. 62/153,847, filed Apr. 28, 2015, hereby incorporated by reference in its entirety.

FIELD OF THE INVENTION

The present invention relates to sports technologies. More specifically, but not exclusively, the present invention relates to an intelligent playbook application.

BACKGROUND

One of the most important pieces of a strategy in athletics is selecting a play to be called. But before it can be, coaches must teach their athletes their assignments for their own plays—as well as show them what the opponent likes to run. Coaches store a library of these options in a tool called a playbook.

Traditionally, coaches have expressed this information by creating a drawing of what the play should look like, with pen and paper or drawing applications. These tools are simple and easy to use, but don't allow previous drawings to be searched or analyzed with any ease. Coaches are wasting time drawing duplicative plays and concepts—and missing valuable insights with the current implementation.

Therefore, what is needed is a technological innovation which provides efficiencies and insights.

SUMMARY

Therefore, it is a primary object, feature, or advantage of the present invention to improve over the state of the art.

It is a further object, feature, or advantage of the present invention to assist coaches by a technology driven athletic intelligence system.

It is a still further object, feature, or advantage of the present invention to provide an intelligent playbook with a natural user interface.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by an objects, features, or advantages stated herein.

According to one aspect, methods and systems are provided which allow a coach to draw up plays very simply, but still get the benefits of having searchable and analyzable plays. This process includes a drawing mechanism (with options of how to express components of a play), an intelligent layer to capture specifics of the drawing and recognize entities, and a database. The drawing tool is designed to mirror existing drawing applications as closely as possible—so the coach does not have to learn new tools or adjust habits. However, it is unique in the fact that the drawing application sits on top of an intelligent layer that captures the (X,Y) data associated with what the coach expresses. The system automatically maps the (X,Y) data together to understand and create entities instantaneously—including the formation, assignments, and personnel. Once each entity is understood, it may be tagged to the play according to the coaches' terminology. At the end, individual details and components of the play now surround it in a structured database. This enables better search, faster play creation, analytics, and opportunities to speed up and improve processes in other coach tools (particularly the pieces identified in our athletic intelligence system).

According to another aspect, the system also integrates with other tools that may collect (X,Y) or spatial data—like wearable technology or image/video recognition technologies—amongst others. In this case, the system can leverage this data to attach the structured data per the above—but also create a corresponding playbook image.

According to another aspect, a method for receiving input into a technology driven athletic intelligence system from a user is provided. The method includes receiving, at a computing device, user drawn input describing a player assignment. While receiving the user drawn input, the method provides for monitoring using the computing device, slope changes of the user drawn input and time interval changes of the user drawn input. The method further provides for using the slope changes of the user drawn input and the time interval changes of the user drawn input by the computing device to identify a pivot point associated with the player assignment. The method further provides for re-drawing using the computing device, the user drawn input using the pivot point, slopes of the user drawn input and distances associated with the user drawn input. The method may further provide for classifying the user drawn input as the player assignment selected from a set comprising a plurality of player assignments. The method may further provide for identifying the player assignment to the user using the computing device. The method may further provide for filtering a set of plays based on the player assignment or searching a set of plays based on the player assignment. The player assignment may be a pass route, a run route, or other type of player assignment. The method may further provide for displaying to the user a formation of players before receiving at the computing device the user drawn input describing the player assignment. The method may further provide for classifying the user drawn input as the player assignment and tagging a play with the player assignment. The method may further provide for displaying at a display associated with the computing device video of a play wherein the user drawn input describes the player assignment for the play. The method may further provide for building a play comprising a plurality of tags including a formation tag and a tag for the player assignment and tags for additional player assignments. The method may further provide for duplicating the play for a plurality of different formations. The method may further provide for associating an event comprising an execution of the play with the play and with a result of the play. The method may further provide for performing an analysis of a plurality of events including the event. The method may further provide for receiving user input grading performance of a player associated with the event based on the player assignment and execution of the player assignment by the player.

According to another aspect, a system for a technology driven intelligent play book is provided. The system may include a computing device configured to perform steps of (a) receiving, at the computing device, user drawn input describing a player assignment, (b) while receiving the user drawn input, monitoring using the computing device, slope changes of the user drawn input and time interval changes of the user drawn input, (c) using the slope changes of the user drawn input and the time interval changes of the user drawn input by the computing device to identify a pivot point associated with the player assignment, and (d) re-drawing using the computing device, the user drawn input using the pivot point, slopes of the user drawn input and distances associated with the user drawn input. The system may further include a structured database in operative communication with the computing device wherein the structured database is configured to store the player assignment and tag one or more plays with the player assignment.

The Intelligent Playbook application is designed as a piece of the broader Athletic Intelligence System. The Athletic Intelligence System combines several coach tools and robust data mapping to improve all of a coach's interaction with information. The Intelligent Playbook is complemented by it, but also stand alone.

DETAILED DESCRIPTION

An intelligent digital coaching playbook and related methods and systems are provided that automatically converts freehand drawing to a structured, relational, and classified database to improve related coaching processes, make plays searchable, and enable analytics.

Figure 1:
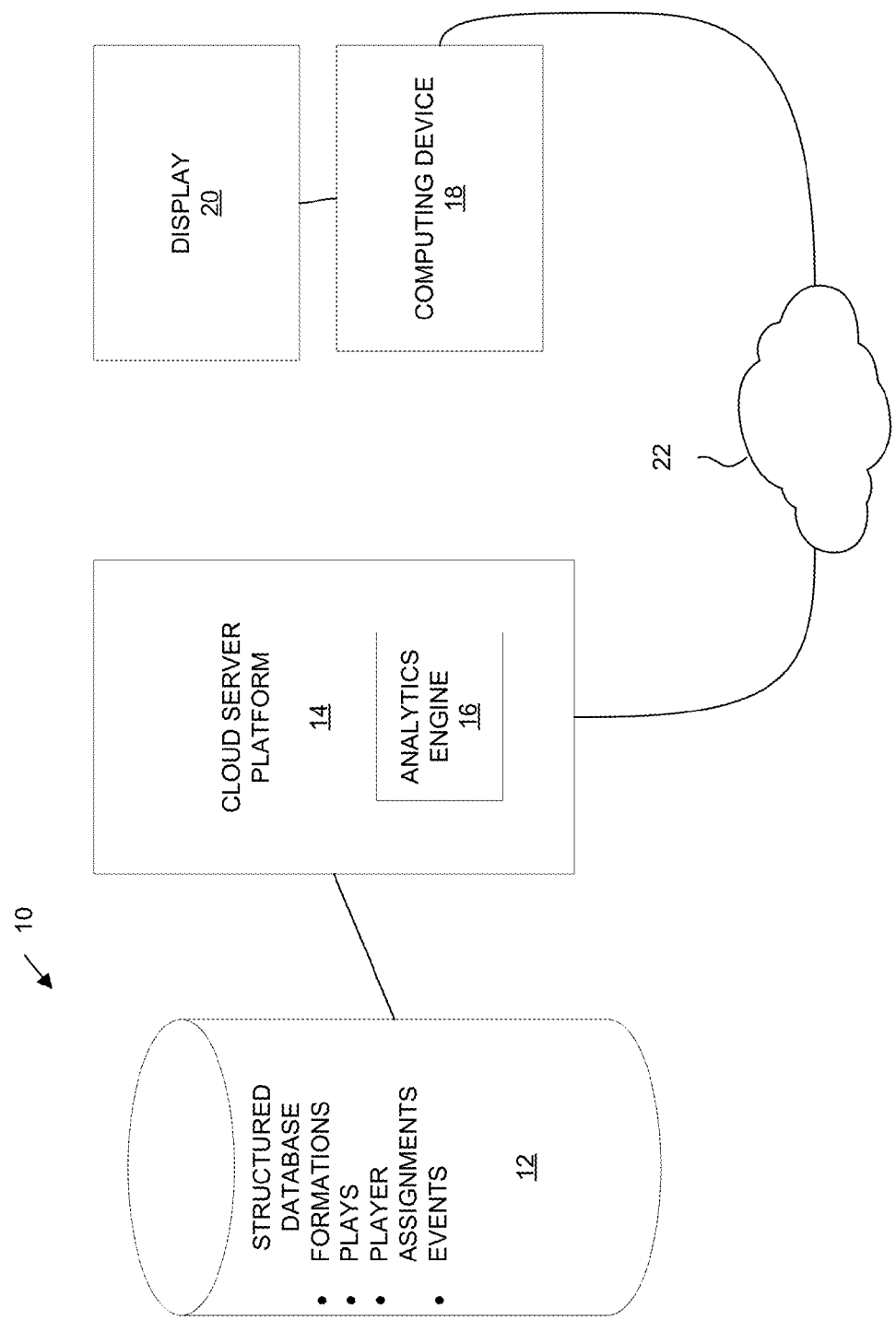
FIG. 1 illustrates one example of a basic architecture for an athletic intelligence system.

FIG. 1 illustrates one example of a basic architecture for an athletic intelligence system. A system 10 is shown which may include a structured database 12. The structured database 12 may be a relational database which may save different entities separately and recognize similar characteristics. For example, formations, plays, player assignments, events and other types of information may be separately saved within the database 12. A cloud server platform 14 is provided which may include the analytics engine 16 for performing analytics across different sets or subsets of data. A computing device 18 may be in operative communication with the cloud server platform over a network 22 such as the Internet. A display 20 may be operatively connected to the computing device 18. Although a basic architecture is shown in FIG. 1, numerous variations may be implemented. For example, instead of a cloud server platform a local system may be used. Processing of various tasks may be performed by the computing device alone or in conjunction with the cloud server platform 14. The computing device 18 and display 20 may be separate devices or integrated together such as in a tablet computer. Instructions may be stored on a non-transitory computer readable storage medium of the cloud server platform 14 and/or the computing device 18.

Figure 2:
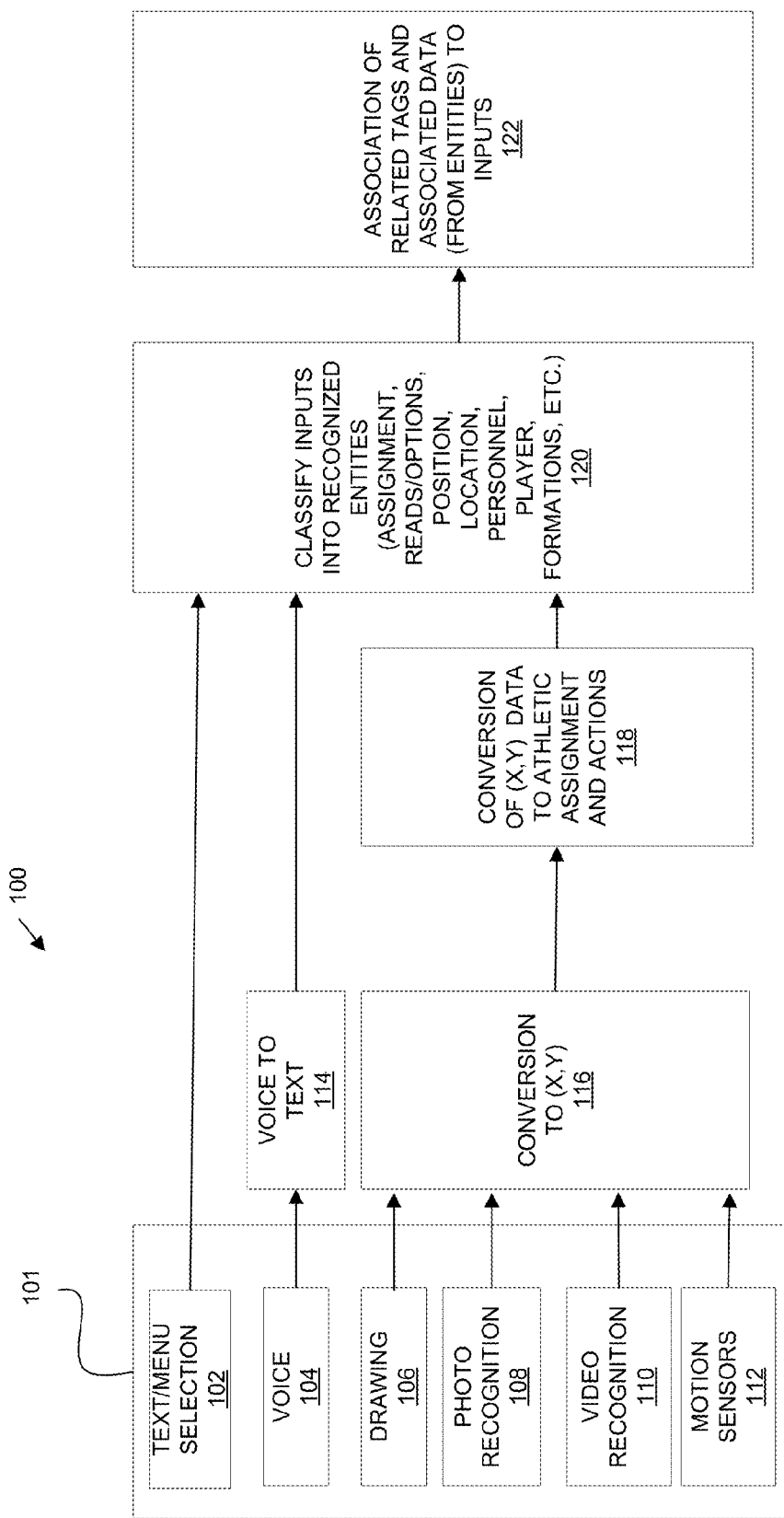
FIG. 2 illustrates one example of a method.

FIG. 2 illustrates another example of a methodology 100. Various natural user inputs 101 are shown. These may include text or menu selection 102, voice input 104, drawing input 106, photo recognition 108, video recognition 110, or motion sensors 112. Depending upon the type of input additional processing may be performed. For example, where voice input 104 is used, the voice input may be converted to text as a part of a voice to text as a part of conversion process in step 114. For user input via drawing 106, photo recognition 108, video recognition 110, or from motion sensors 112 the user input may be processed in step 116 to convert the user input to appropriate spatial coordinates such as x and y coordinates. Next in step 118, the spatial coordinate (e.g. X, Y data may be converted to athletic assignments and actions. In step 120 the inputs are classified into recognized entities such as, without limitation, assignment, reads or options, position, location, personnel, player, or formations. Then in step 122 related tags and associated data from the entities are associated with the input data.

According to one aspect a system is provides a digital tool—which works on any type of properly configured and/or connected computing device (PC, smartphone, tablet, etc.). Users engage with a drawing application—which can be set to scale to the playing area (to optimize for visualizing spacing), or non-scale to optimize for viewing.

For this example, we will focus on football. A user generally begins by placing players on the field, simply by clicking their location. As the coach selects the locations, the system may track each player location through their set X, Y coordinates. The system may then classify the placement of the 11 players as a formation—which can be named by the coach or in the system. When the coach saves this play—the formation, personnel, and assignments are saved individually—allowing the coach to be able to speed up subsequent play creation. When creating a new play, simply selecting the formation will populate all the players' positions on the field.

The coach may then select the personnel on the field. He may do this through a menu or selection experience, but the system can also leverage the "field zones" from the formation process to make an assumption. In the specific field zones (relative to the position of the ball), the system can automatically assign the players and use rules to identify specific positions. For example, in the RB zone—generally with 2 running backs—the player closer to the line of scrimmage is a fullback. All assumptions can be overridden by the coach, but in most cases it will heavily speed up the process.

Figure 3:
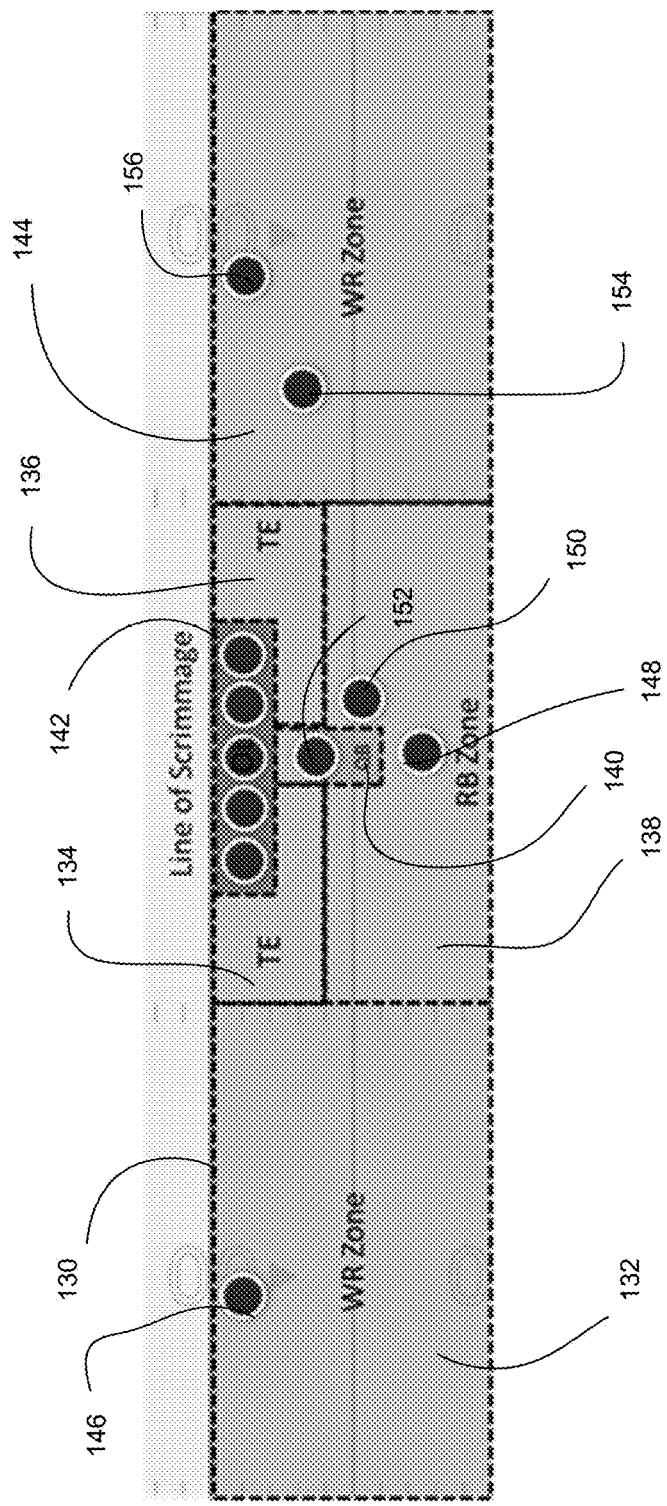
FIG. 3 illustrates an example of different zones within a field associated with different player positions.

FIG. 3 illustrates a further example. A portion of a football field is shown. A line of scrimmage 130 is shown which extends across the football field. Different zones are provided which are associated with different players' positions. These include a wide receiver zone 132, a tight end zone 134, another tight end zone 136, a running back zone 138, a quarterback zone 140 (in which the quarterback 150 is located), an offensive line zone 142, and a another wide receiver zone 144. In this specific example above, the placement of the players in the field indicates 20 personnel (two running backs 148, 150, zero tight ends)—which implies three wide receivers—currently split one to the left 146 and two to the right 154, 156. With the location of doubles to the right, the backfield is in a Strong I—with the fullback 150 offset towards the formation strength. With the coach simply placing players on the field, we can leverage assumptions to tag this formation with:

Personnel—20
Formation Strength—Right
Alignment—1×2
Balanced—No
Line Shift—No
Backfield Count—2
Backfield Strength—Right
Backfield—IN
Left End—Split
Right End—Split
Line Splits—Normal
Unbalanced Line—No
QB—Under Center
Formation Group—3 Wide
Z Split—N
X Split—N
F Split—I
TE Location—None
Set—None Note that in applying these tags to this formation, the field zones may be used to identify the player positions.

Understanding the roster positions of the players on the field also empowers the system to connect with the depth chart, then project who would be on the field when the play is called. This speeds up processes in other coaching tools and enables additional analytical techniques. For example, identifying the starting running back and his speed could indicate a mismatch exists against an opponent player—which may be visually displayed on the play card during preparation for the opponent. Another example, the player information may be passed along to a film analysis application when the play is called. This would enable a player to watch all the plays where he was on the field, immediately. Or it could enable the coach to know who is on the field for grading and sharing information with players.

Figure 4:
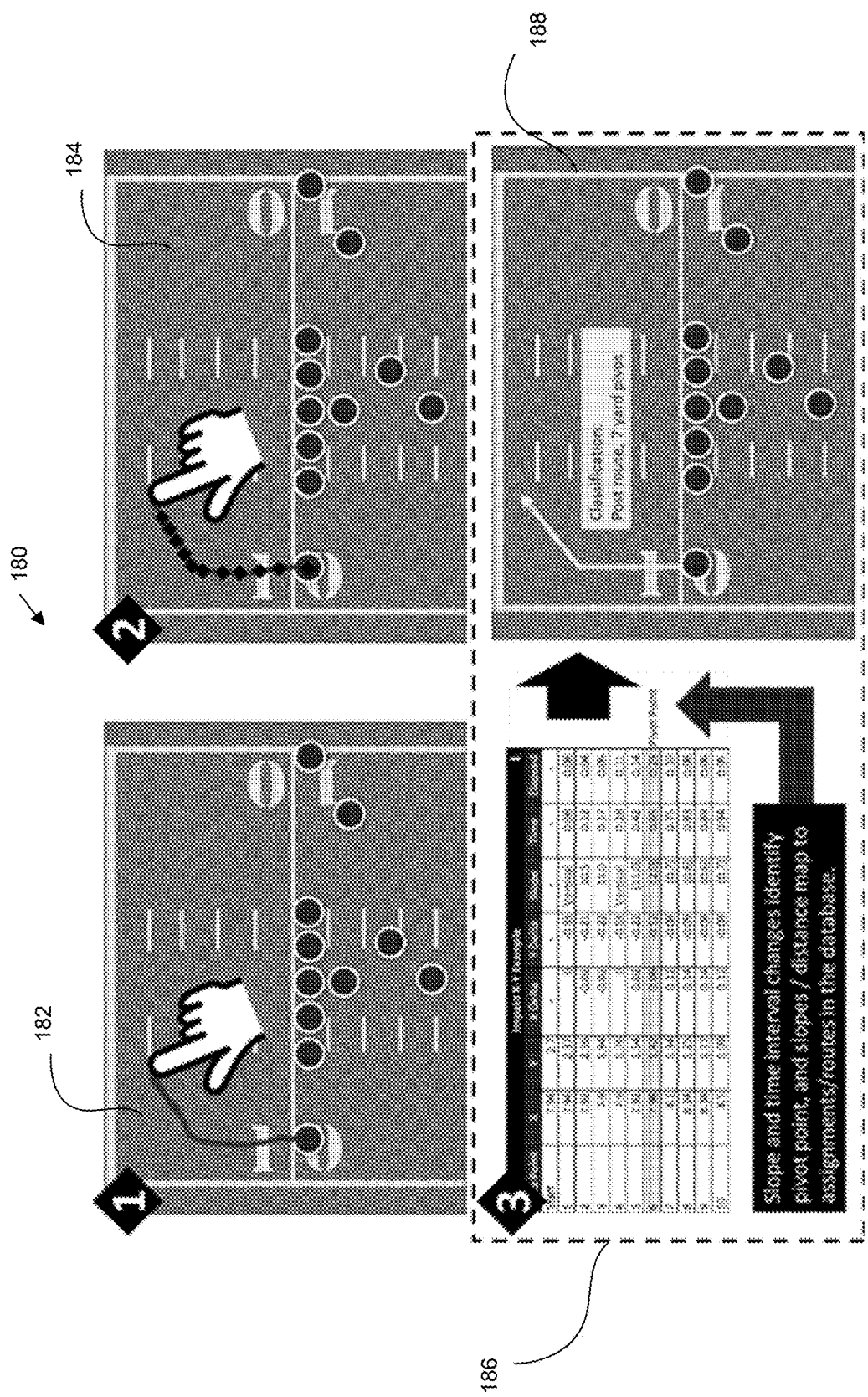
FIG. 4 illustrates a method for using slop and time interval changes to identify a pivot point and slopes and distances to map to assignments/routes within a database.

To complete the play creation, the coach must express the assignments of the players on the field. This may be performed through a combination of drawing and menus. The coach often just draws the assignment for players—either indicating who they are supposed to block, or where they are supposed to go. FIG. 4 illustrates one example of this process 180. In step 182, as the coach draws, the system collects the X, Y coordinates and time stamps instantly in step 184. The most important parts of pass routes are the pivot points and angle at which the receiver runs after pivoting. The system analyzes the slope change alongside the time stamp between points (users tend to slow down their drawing speed when approaching a pivot point) to determine the pivot point—and then uses the slope to determine the route as shown in step 186. The user can easily adjust the pivot point up or down, or click on the route to see a modified list of similar routes they can select. Thus, instead of a rough hand drawn route input by the user in step 182, a clean route is produced in step 188 which in this example, includes a first line segment from the player's initial position to the pivot point and then another line segment from the pivot point which extends at the angle which the receiver is to run after pivoting.

Thus, user drawn input describing a player assignment is received at a computing device. While receiving the user drawn input slope changes of the user drawn input and time interval changes of the user drawn input are monitoring. The slope changes of the user drawn input and the time interval changes of the user drawn input are used by the computing device to identify a pivot point associated with the player assignment. Then the user drawn input is re-drawn using the pivot point, slopes of the user drawn input and distances associated with the user drawn input.

After completing this process, a coach has now created a play in his system. However, he has also created or associated multiple entities to this play. He's expressed a formation entity—which is the combination of the 11 player locations pre-snap. He's expressed a personnel grouping for this play—which consists of which roster positions should be on the field. That information can connect to his depth chart—which can make an assumption about the 11 actual players on the field. He's also expressed 11 assignments for the players. Groups of similar player assignments can be rolled up in another entity—for example—all blocking players can be classified as the "protection." All of this information is available in his libraries as entities. Anytime the coach calls these plays or references these plays, he's also referencing and generating data about these other entities. This information will be vital for analysis as we move forward.

In the end, the coach has completed the data collection and classification process, simply by drawing as he would for any other drawing application. The conversion to structured data and appropriate classifications are completed for him automatically by the system (although he can manually adjust and add any classifications himself). This application can stand alone, or the data can be integrated with other data from the Athletic Intelligence System—to be both delivered as insights to aid in decision making or to speed up other processes.

Figure 5:
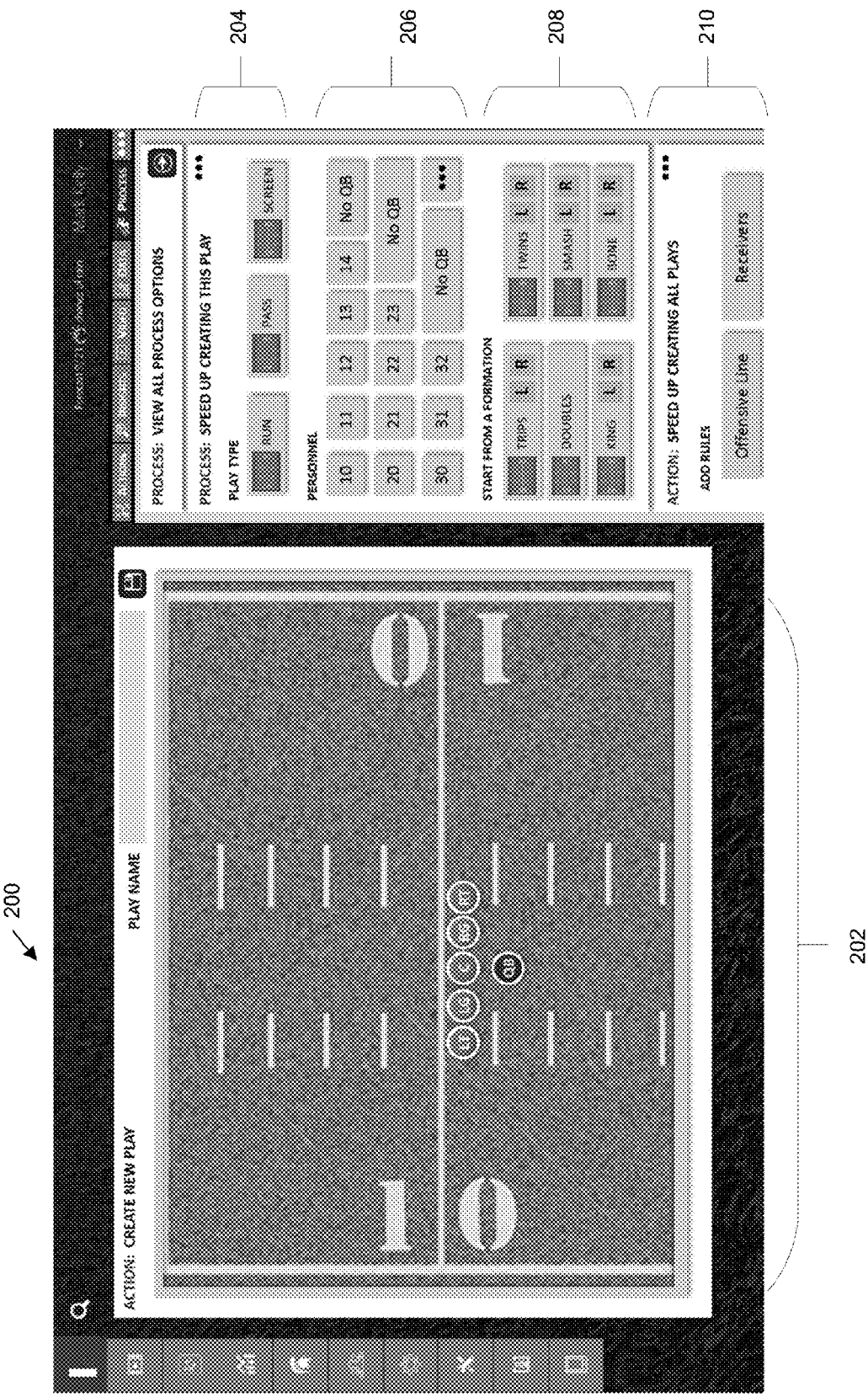
FIG. 5 is a screen display illustrating creation of a new play.

FIGS. 5-12 provide a further illustration of creating a new play. FIG. 5 shows a screen display 200 which includes a portion of the football field 202. To assist in creating the play the user can select a type of play 204. Examples of types of play may include a run, a pass, or a screen. Of course, other types of plays may also be present. The user can also select the personnel 206. Examples of possible selections may be 10, 11, 12, 13, 14, no quarterback; 20, 21, 22, 23, no quarterback; and 30, 31, 32, no quarterback. In this nomenclature, the first digit may indicate the number of running backs and the second digit may indicate the number of tight ends. Other selections for the personnel may also be present. Also to assist in creating the play, the user may select the formation to start from 208. In addition, the user may add rules 210 to speed up creating plays. Although the various selections discussed may be used to position players on the field 202, the user may further adjust the positions of players on the field 202 as desired.

Figure 6:
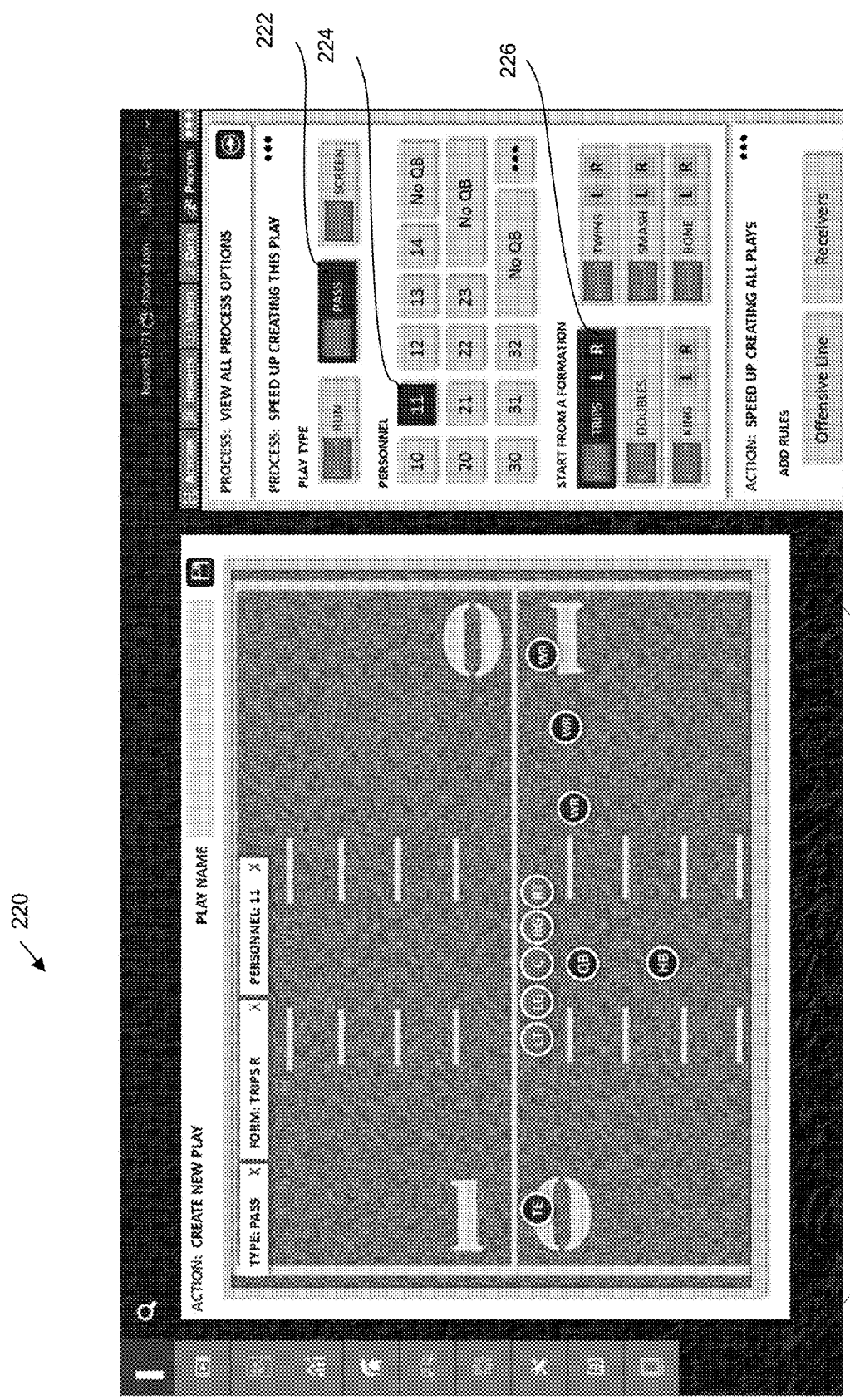
FIG. 6 is a further screen display illustrating creation of a new play by selecting a play type, personnel, and a formation.

FIG. 6 shows a screen display 220 where a user has selected a play type of "PASS" 222 and a personnel of "11" 224. Note that players have been positioned on the field 228 consistent with these selections. In addition, these selections may be used as tags.

Figure 7:
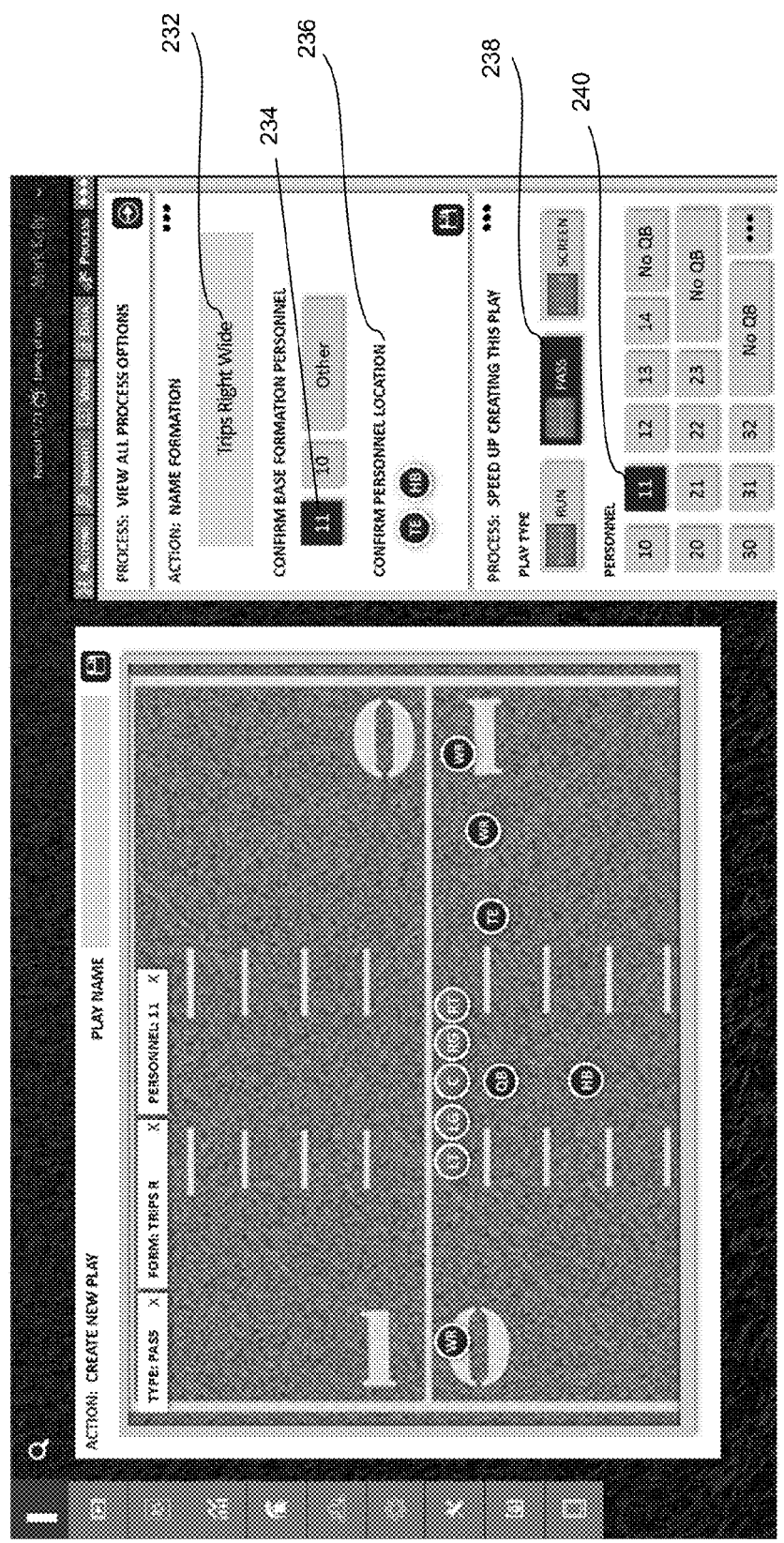
FIG. 7 is a still further screen display illustrating creation of a new play.

FIG. 7 shows a screen display 230. The formation may be named with a formation name 232. The base formation 234 may be confirmed and the personnel location may be confirmed 236 for particular player positions. The type of play, "PASS" 238 is shown as well as the personnel "11" 240. The players are shown positioned on the field 242 according to the selections made.

Figure 8:
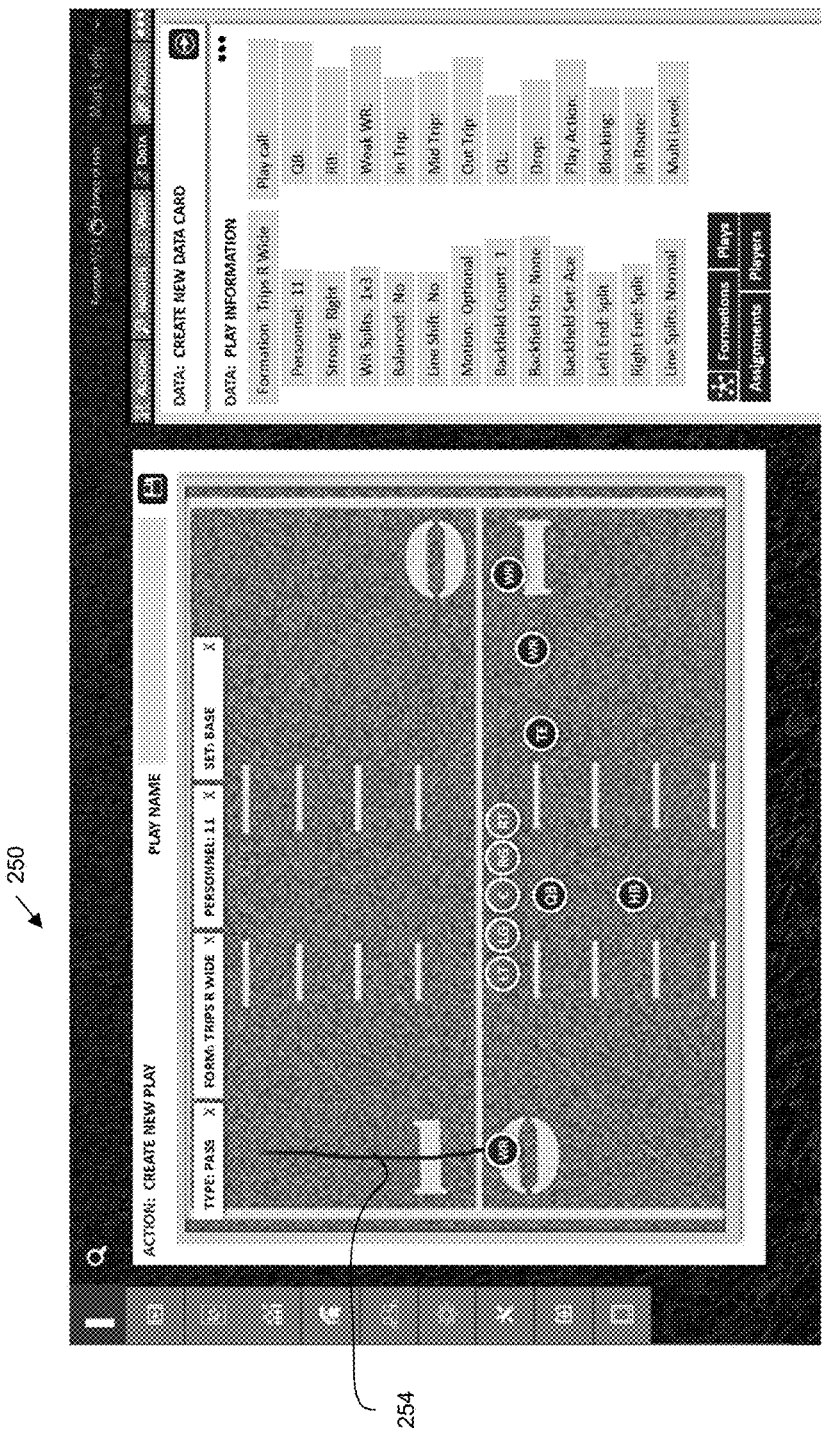
FIG. 8 is a screen display illustrating a user drawn player assignment in the form of a route for a wide receiver.

FIG. 8 shows a screen display 250 with a field 252. Now that the formation has been determined additional play information may be input such as receive route information. One example of a receiver route 245 is shown. Note that the route shown is a hand drawn route such as a user may input via a touch interface or using a mouse or other input device.

Figure 9:
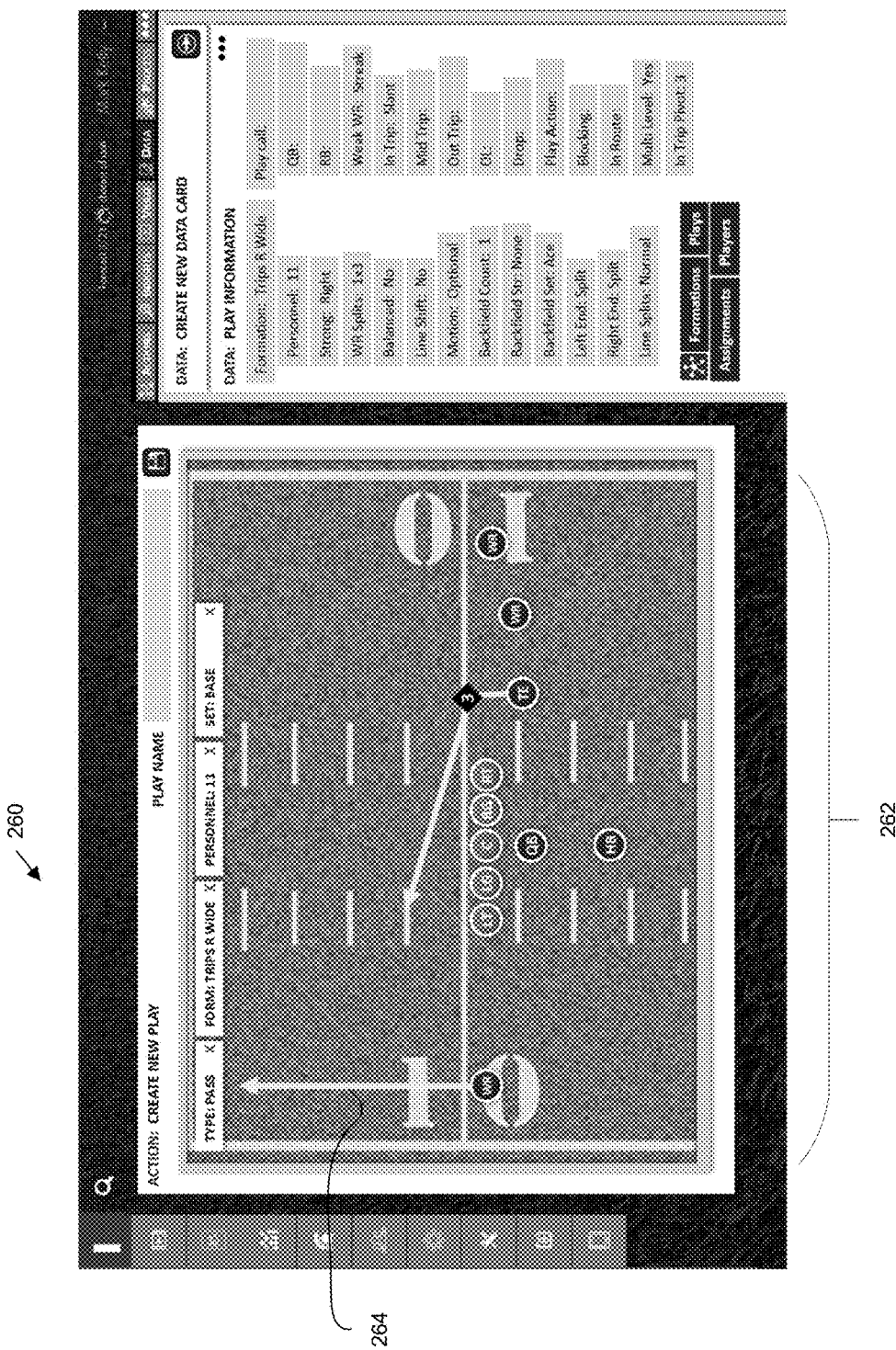
FIG. 9 is a screen display illustrating a computer drawn route based on the user drawn route and a classification for that route ("Streak").

FIG. 9 shows a screen display 260 with a field 262. Note that the methodology of the present invention has been applied to transform the hand drawn route to a clean route 264, in this instance formed of a line which ends with an arrow showing the direction of travel. An additional route is also shown. Also, the route or player assignment originally drawn by the user has been classified. In this instance, a wide receiver route has been classified as a "STREAK" route.

Figure 10:
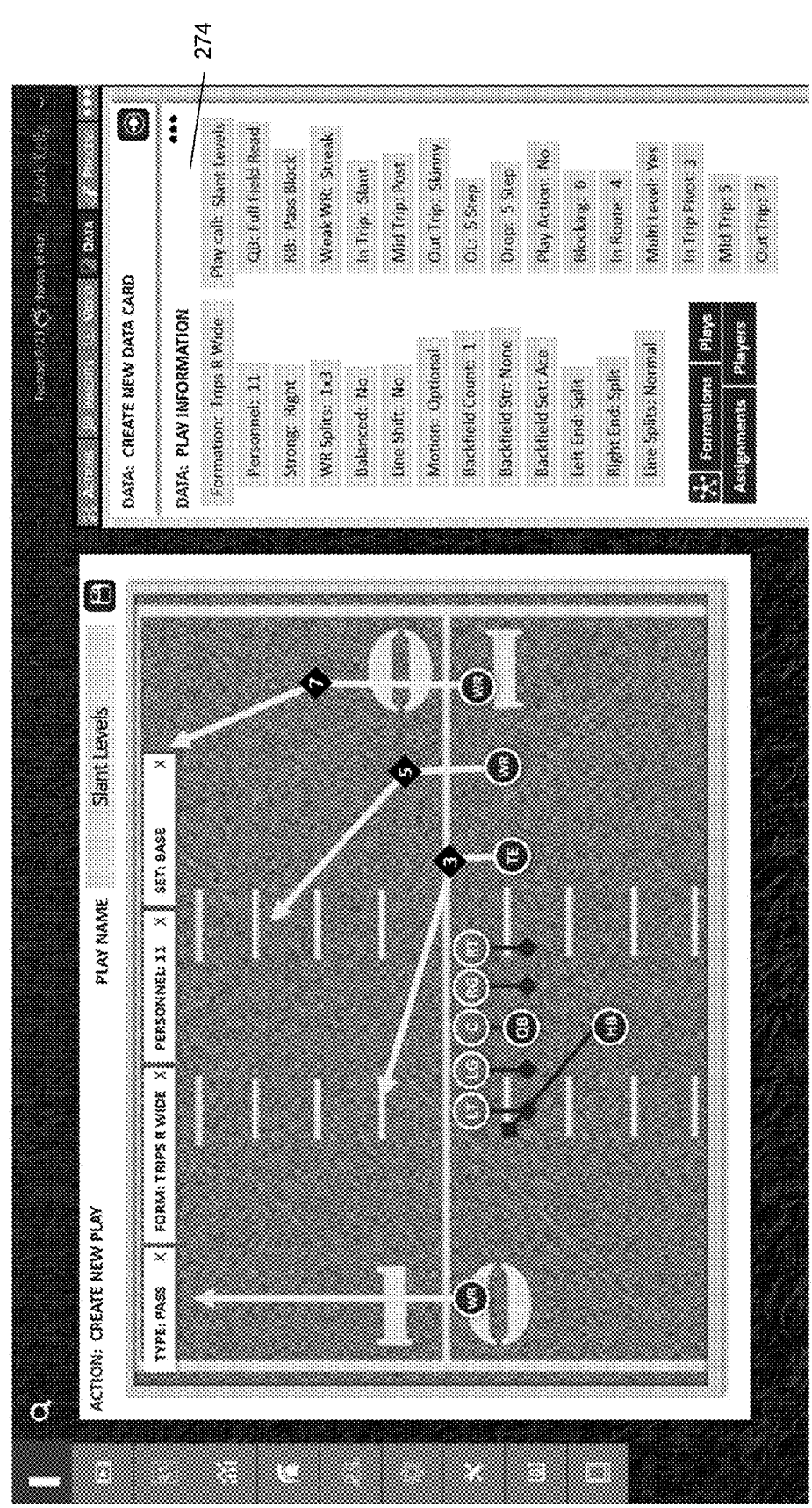
FIG. 10 is a screen display illustrating a play with player assignments and play information.

FIG. 10 shows a screen display 270 with a field 272. As shown in FIG. 10, assignments for the players including route information and blocking assignments are provided. To the right of the field 272 various play information is shown for both the formation and the play call.

Figure 11:
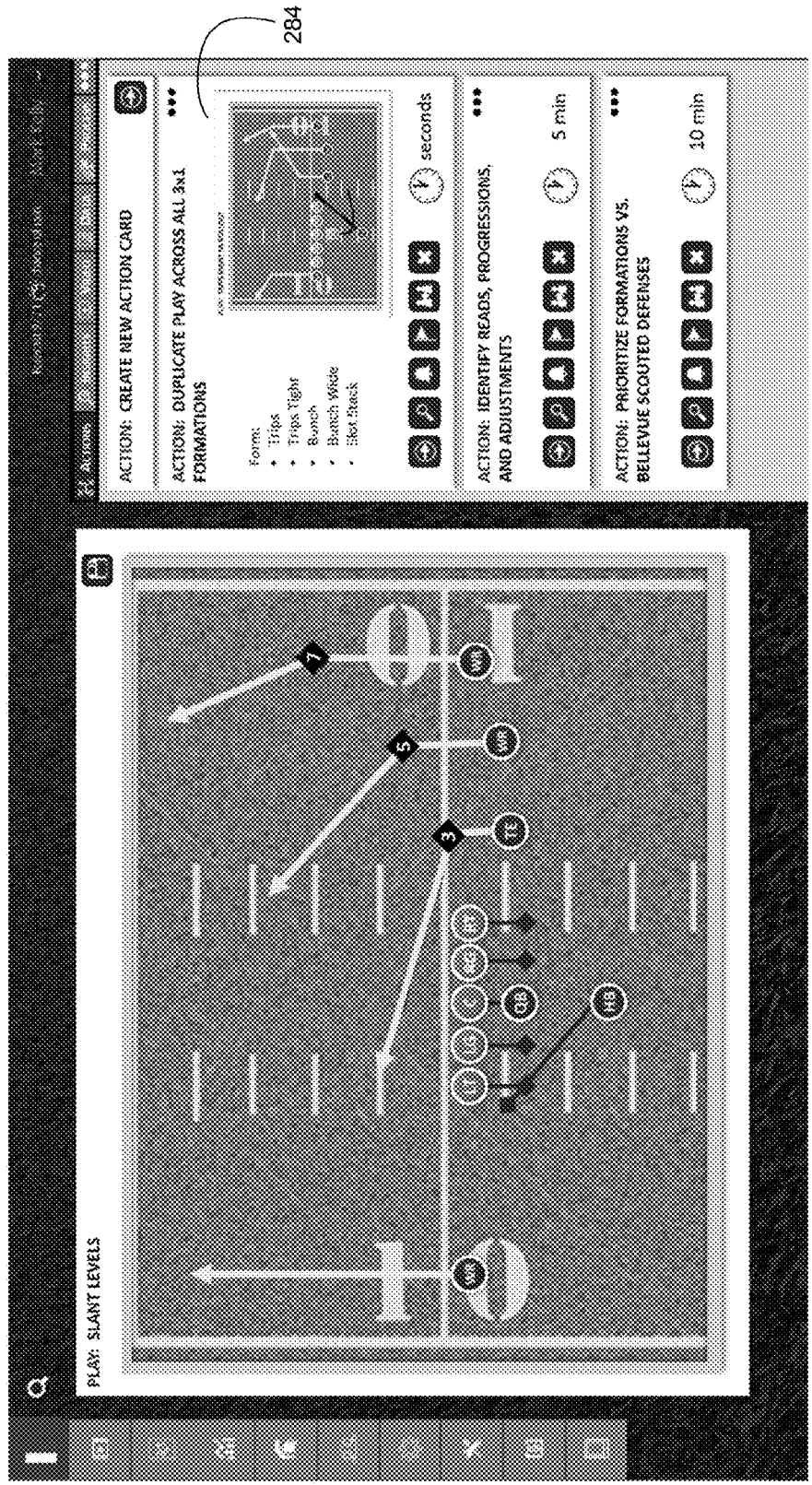
FIG. 11 is a screen display illustrating a function to duplicate the play across a plurality of different formations.

FIG. 11 shows a screen display 280 with a field 284. As shown in FIG. 11, assignments for the players are provided showing a complete play. To the right an option to take an action 284 to duplicate the play across all 3×1 formations is provided. Often coaches will use the same play but run from a different formation. This option allows a coach to very quickly create additional plays without needing to repeat the effort of re-creating the play for a different formation.

Figure 12:
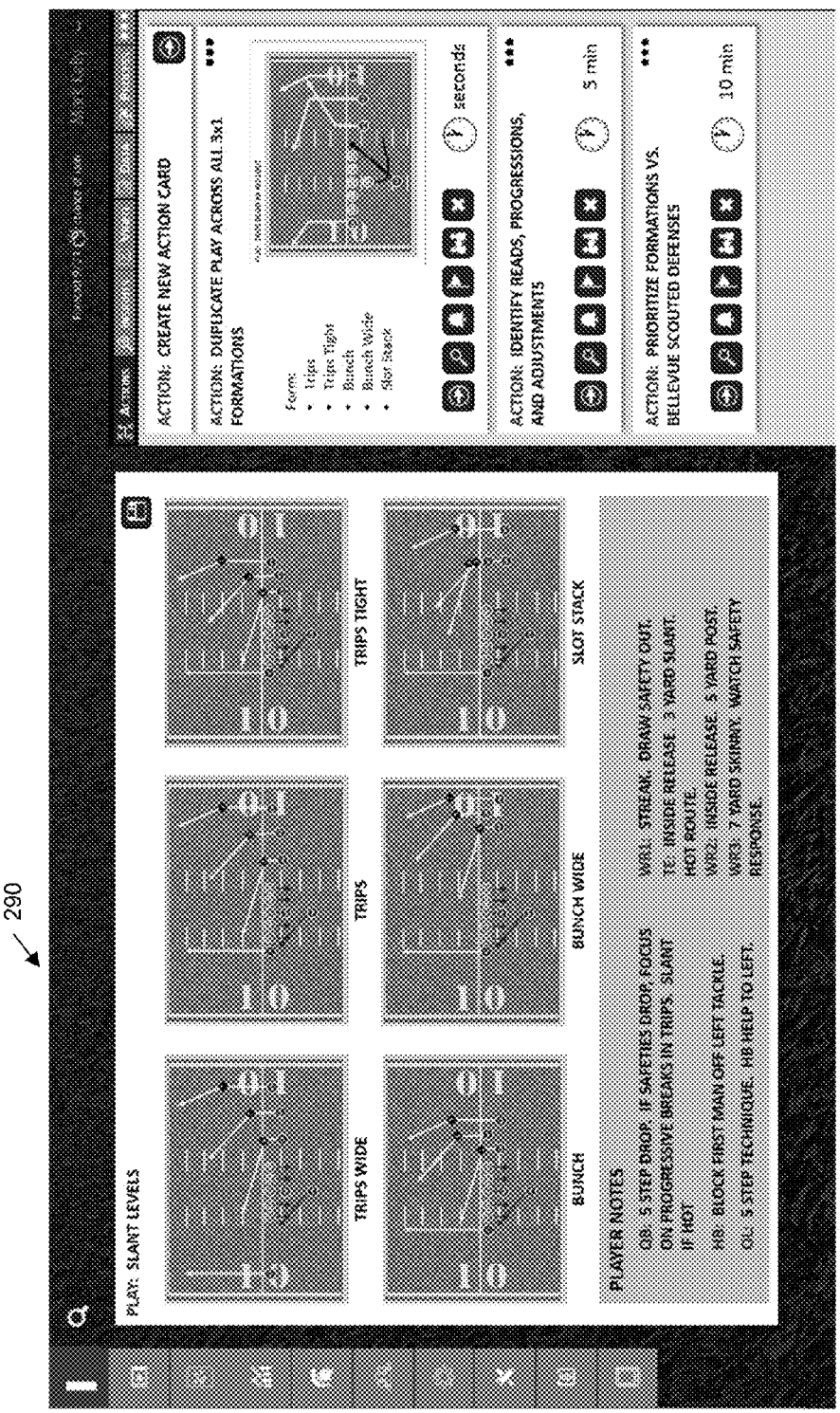
FIG. 12 is a screen display illustrating a play ("SLANT LEVELS") duplicated across multiple formations.

With the structured database, the Intelligent Playbook saves entities separately and recognizes similar characteristics—which enables coaches to save steps when creating variations of plays. For example, the coach has created a play called Slant Levels out of a Trips Open formation. The system gives him the option to duplicate that play call across all similar formations by clicking a button. The system maps the assignment data to the correct personnel and their placement in the other formations—creating several versions automatically. FIG. 12 shows a screen display 290 which includes a set of plays 292 created from the duplication step shown in FIG. 10. The routes for the receivers are shown for a play called "SLANT LEVELS." Thus multiple variations of plays may be created instantly.

The data collection and classification process described above is one aspect of a system which may also provide for data integration and analysis as well as data prioritization, delivery, mobilization, and storage.

With a detailed understanding of each play in a structured database, and additional performance data brought in from the Athletic Intelligence System (or other data sources), the Intelligent Playbook application makes several processes more efficient and enables better analysis. One such example as previously explained is the ability to instantly create multiple variations of plays.

Another feature allows for drawing search/filters or instant recognition of previously drawn plays. With the structured database, the Intelligent Playbook saves entities separately and recognizes similar characteristics—which can be used in a search application. With the ability to convert drawings to structured data immediately—the system enables queries that are actually drawn—rather than typed.

For example, as a coach draws or enters information about a play, the system filters his existing plays based on what he enters. For example, if a coach is identifying an opponent play they ran during a game—he may not know if he's already drawn this play. He can just start to draw—and the system surfaces similar plays they've run in that situation—so he can select the appropriate play, speeding up his time and understanding trends of how often that play is called.

Figure 13:
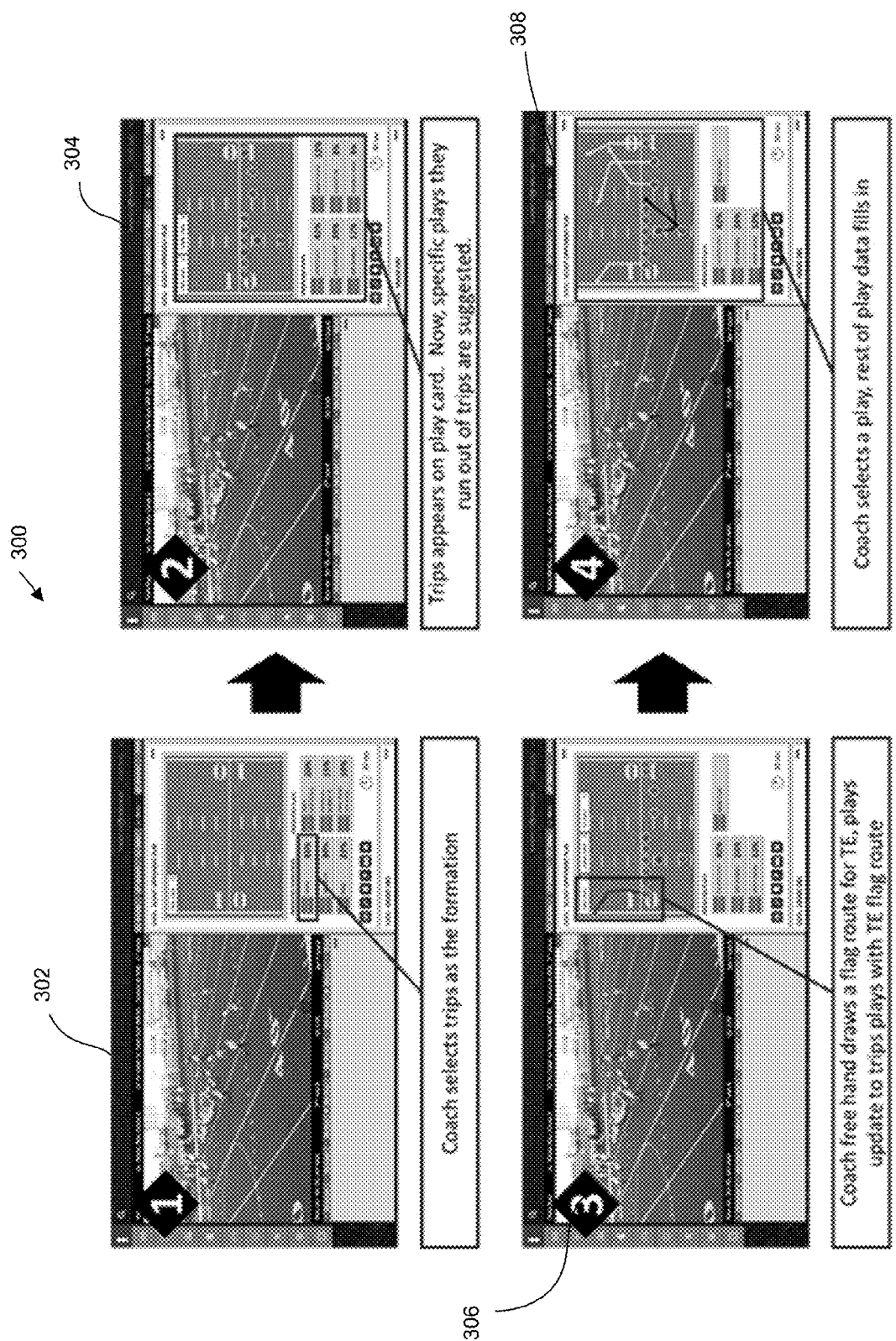
FIG. 13 illustrates a process of using user drawn input for searching and filtering plays.

FIG. 13 illustrates one example of such a method 300. In step 302, a coach selects trips as the formation. In step 304, trips appears on a play card. Now specific plays which are run out of the trips formation are suggested. In step 306, the coach free hand draws a flag route for the tight end (TE) and the plays which are shown are updated to only the trips plays where the TE runs a flag route. Note that the particular route may be identified based on the hand drawn route in the manner previously described. Then in step 308, the coach may select the play and rest of the play data associated with that play fills in such as route information for other receivers, blocking and other assignments, etc. Thus, in the example shown in FIG. 13, the drawing search/filters allows for instant recognition of previously drawn plays.

Another benefit is the ability associate play data to film, data to play, and/or analytics. In the scenario above, the coach is describing information in a film analysis setting. When he tags the play to the event (ex: Play #3 in our November $3^{rd}$ game), all of the play result data is now associated with the play. This yields several benefits:

- If he has film associated with data about yards gained, he can now understand the effectiveness of specific plays (ex: this play runs for 6 yards per attempt, and gains over 3 yards 80% of time)
- If he associates scouted opponent plays, he can now understand how his play performs against various defenses (ex: against Cover 2 we complete only 40% of passes, but against Cover 3 we complete 70% of passes)
- However, because of the deep understanding of the play—the system can bring him better details on why something is working. For example, the system can look across plays and see what similar types of protection exist. Now, a coach can understand the specific driver of multiple plays performance (ex: this protection works against this blitz 82% of the time, and when it fails, it's off the right side).
- The data from the play is also now associated with the film clips. This enables creation of customized playlists immediately. For example, a coach could be interested in watching "every play where my right tackle is seal blocking"—and instantly have that video and associated data.
- When combining scouted play calls with situational data, one can start to understand when the opponent likes to call certain plays. This insight can be leveraged in a variety of different ways—including creating better scouting reports, predictive scripting (getting the right matchups in practice to prepare for the game), and even real time prediction in the game.

According to another aspect, macro data analysis and play improvement suggestions may be provided. The system may be deployed across multiple teams. With the way the data is collected at a macro level, the system is able to recognize if the same play (or slight variations) are used by multiple teams. In this scenario, there may be insights from a macro data set that can benefit all teams—without giving away the private information of any.

For example, 800 teams may run a power blast play off the right tackle. However, 400 may run it with a TE on the line of scrimmage and 400 may run it with the TE lined up as a wing. The playbook system may analyze which works better—and suggest the change for all coaches. If they accept, the play may be changed with one click rather than redrawn.

The macro data analysis may be performed with any number of statistical techniques. With the structured database, the ability to perform macro data analysis is simplified.

Another feature of the playbook is a playbook translator. When players transition to the next level (HS to college, or college to professional), both coaching staffs have a vested interest in seeing that player succeed. One challenge is the new terminology from a new system. If both teams use the Intelligent Playbook application, it can be the translator. The system can show a player what his previous terminology is now called—speeding up his learning curve. This may be performed by mapping the terminology used by the old team with the terminology used by the new team. The structured database provides for objective descriptions of plays and assignments and thus can map play names between different systems, highlight assignment differences on similar plays, or otherwise emphasize similarities and/or differences between the playbook of the old team and the playbook of the new team.

Yet another feature of the playbook relates to faster grading. Grading players is complicated. It requires understanding of the player assignment, having a checklist of proper technique, responding to reads/options, and watching the film while completing the checklist.

Figure 14:
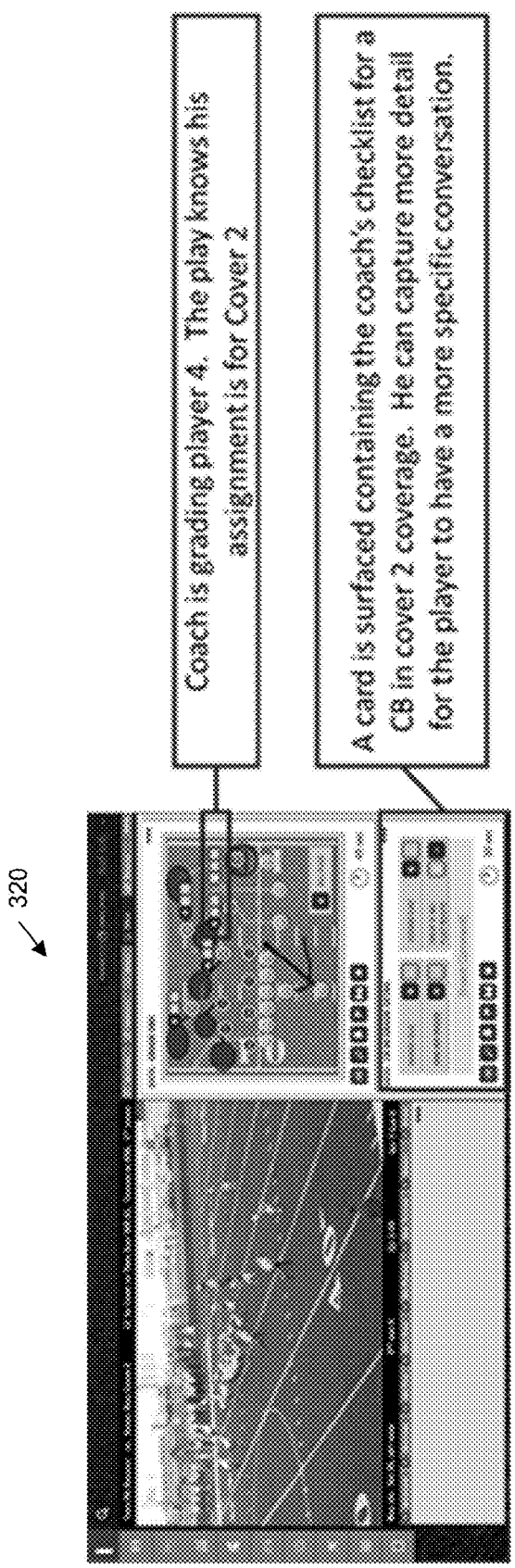
FIG. 14 illustrates a process of grading plays using known assignments for a player for the play.

With the system's ability to identify similar assignments across plays and map them to a specific player, the system can now automatically surface the correct grading checklist for every player in the moment of watching film. FIG. 14 illustrates a screen display which may be used for grading. A player may be selected to grade. In this example, the coach may be grading player 4 and the player may know that his assignment is for Cover 2. Note that as shown in FIG. 14, film for a play may be shown to the left and the play card may be shown at the right. A card may be surfaced containing the coach's checklist for a cornerback (CB) in cover 2 coverage. The coach may capture more detail for the player in order to have a more specific conversation with the player.

Therefore an intelligent playbook and related methods and systems have been shown and described. Although specific examples are provider, it is to be understood that the technology may be used in numerous ways to improve coaching preparation. The present invention contemplations numerous options, variations, and alternatives as may be apparent to one skilled in the art having the benefit of this disclosure.

What is claimed is:

1. A method for receiving input into a technology driven athletic intelligence system from a user, the method comprising:
   receiving, at a computing device, user drawn input describing a player assignment;
   while receiving the user drawn input, monitoring using the computing device, slope changes of the user drawn input and time interval changes of the user drawn input;
   using the slope changes of the user drawn input and the time interval changes of the user drawn input by the computing device to identify a pivot point associated with the player assignment;
   re-drawing using the computing device, the user drawn input using the pivot point, slopes of the user drawn input and distances associated with the user drawn input.

2. The method of claim 1 further comprising classifying the user drawn input as the player assignment selected from a set comprising a plurality of player assignments.

3. The method of claim 2 further comprising identifying the player assignment to the user using the computing device.

4. The method of claim 3 further comprising filtering a set of plays based on the player assignment.

5. The method of claim 3 further comprising searching a set of plays based on the player assignment.

6. The method of claim 1 wherein the player assignment is a pass route.

7. The method of claim 1 further comprising displaying to the user a formation of players before receiving at the computing device the user drawn input describing the player assignment.

8. The method of claim 1 further comprising classifying the user drawn input as the player assignment and tagging a play with the player assignment.

9. The method of claim 1 further comprising displaying at a display associated with the computing device video of a play wherein the user drawn input describes the player assignment for the play.

10. The method of claim 1 further comprising building a play comprising a plurality of tags including a formation tag and a tag for the player assignment and tags for additional player assignments.

11. The method of claim 10 further comprising duplicating the play for a plurality of different formations.

12. The method of claim 10 further comprising associating an event comprising an execution of the play with the play and with a result of the play.

13. The method of claim 12 further comprising performing an analysis of a plurality of events including the event.

14. The method of claim 12 further comprising receiving user input grading performance of a player associated with the event based on the player assignment and execution of the player assignment by the player.

15. A system for a technology driven intelligent play book, the system comprising:
   a computing device configured to perform steps of (a) receiving, at the computing device, user drawn input describing a player assignment, (b) while receiving the user drawn input, monitoring using the computing device, slope changes of the user drawn input and time interval changes of the user drawn input, (c) using the slope changes of the user drawn input and the time interval changes of the user drawn input by the computing device to identify a pivot point associated with the player assignment, and (d) re-drawing using the computing device, the user drawn input using the pivot point, slopes of the user drawn input and distances associated with the user drawn input;
   a structured database in operative communication with the computing device wherein the structured database is configured to store the player assignment and tag one or more plays with the player assignment.

* * * * *